(12) United States Patent
Wang

(10) Patent No.: US 12,493,983 B2
(45) Date of Patent: Dec. 9, 2025

(54) METHOD, DEVICE, AND NON-TRANSITORY COMPUTER READABLE MEDIUM FOR DETECTING LABEL ON CURVED CONTAINER

(71) Applicant: HON HAI PRECISION INDUSTRY CO., LTD., New Taipei (TW)

(72) Inventor: Cheng-Feng Wang, Kaohsiung (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 367 days.

(21) Appl. No.: 18/144,765

(22) Filed: May 8, 2023

(65) Prior Publication Data

US 2023/0368420 A1 Nov. 16, 2023

(30) Foreign Application Priority Data

May 13, 2022 (CN) .......................... 202210524062.7

(51) Int. Cl.
*G06T 7/73* (2017.01)
*G06T 7/60* (2017.01)
*G06T 7/62* (2017.01)

(52) U.S. Cl.
CPC .................. *G06T 7/74* (2017.01); *G06T 7/60* (2013.01); *G06T 2207/30108* (2013.01)

(58) Field of Classification Search
CPC ...... G06V 2201/06; G06T 2207/30204; G06T 7/0004; G06T 2207/30108; G06T 2207/30164; G06T 7/60; G06T 7/73
USPC ........................................................ 382/103
See application file for complete search history.

(56) References Cited

U.S. PATENT DOCUMENTS

2024/0278952 A1* 8/2024 Breu .................... B65G 47/244

FOREIGN PATENT DOCUMENTS

CN 112837257 A * 5/2021 ............... G06T 7/80

OTHER PUBLICATIONS

Gong, Wei, et al. "Adaptive visual inspection method for transparent label defect detection of curved glass bottle." 2020 international conference on computer vision, image and deep learning (CVIDL). IEEE, 2020. (Year: 2020).*
Chen, Si, Yihang Peng, and Ming Yi. "Research on defect detection and sorting device of curved label based on multi-template matching." Journal of Physics: Conference Series. vol. 2384. No. 1. IOP Publishing, 2022. (Year: 2022).*

* cited by examiner

*Primary Examiner* — Henok Shiferaw
*Assistant Examiner* — Dion J Satcher
(74) *Attorney, Agent, or Firm* — ScienBiziP, P.C.

(57) ABSTRACT

A method, a device, and a non-transitory computer readable medium for detecting label on curved container, includes obtaining a first image, the first image comprising a label on the curved container; obtaining a plurality of reference points in the first image; obtaining a first width of the curved container and first position data of the label according to the plurality of reference points; determining whether the curved container is rotated according to the first width and a predetermined standard width; when the curved container rotated being determined, predicting a second width of the curved container according to the first position data and a predetermined regression equation; and determining whether the label is offset according to the first width and the second width.

20 Claims, 14 Drawing Sheets

METHOD, DEVICE, AND NON-TRANSITORY COMPUTER READABLE MEDIUM FOR DETECTING LABEL ON CURVED CONTAINER

CROSS-REFERENCE TO RELATED APPLICATIONS

This application claims priority to Chinese Patent Application No. 202210524062.7 filed on May 13, 2022 in China National Intellectual Property Administration, the contents of which are incorporated by reference herein.

FIELD

The subject matter herein generally relates to machine vision technology, and particularly to a method, a device, and a non-transitory computer readable medium for detecting label on curved container.

BACKGROUND

A curved container refers to a container whose outer surface contains a curved surface, such as a bottle with a curved body, a cup with a curved cup body, etc. On the curved container, a product's tag or label is usually located in an area of the curved surface. At present, to detect the label on the curved surface container on an automatic production line, a fixture is usually used to rotate the curved container, so as to determine a position of the label on the curved surface. The method for locating the label requires frequent operations of the fixture, which reduces a manufacturing efficiency. In situations where manufacturing in a higher rate is required, only rough detections, such as a presence of labels on curved containers, are possible.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape or other word that the term modifies, such that the component need not be exact. The term "comprising," when utilized, means "including, but not necessarily limited to", it specifically indicates open-ended inclusion or membership in the so-described combination, group, series, and the like.

1. Image Coordinate System

Setting up the image coordinate system based on an image that the curved container does not rotate, a horizontal direction of the image coordinate system may be an x-axis direction, that is, a maximum thickness direction when the curved container does not rotate. A vertical direction of the image coordinate system may be a y-axis direction, that is, a maximum width direction when the curved container does not rotate. In the present disclosure, the maximum thickness direction of the curved container does not rotate is the same as a width direction of a conveyor belt on a manufacturing line, and the maximum width direction of the curved container does not rotate is the same as a length direction of the conveyor belt.

2. Distance and Vector

In the present disclosure, a distance between two points in the image coordinate system is represented by a symbol | |, and a vector between two points is represented by the symbol $\rightarrow$. For instance, $|AB|$ represents the distance between two points A and B. $\overrightarrow{AB}$ represents the vector between two points A and B, and the direction of the vector is the direction from point A to point B.

An application scene of the method for detecting label on curved container is described as follows.

Figure 1:
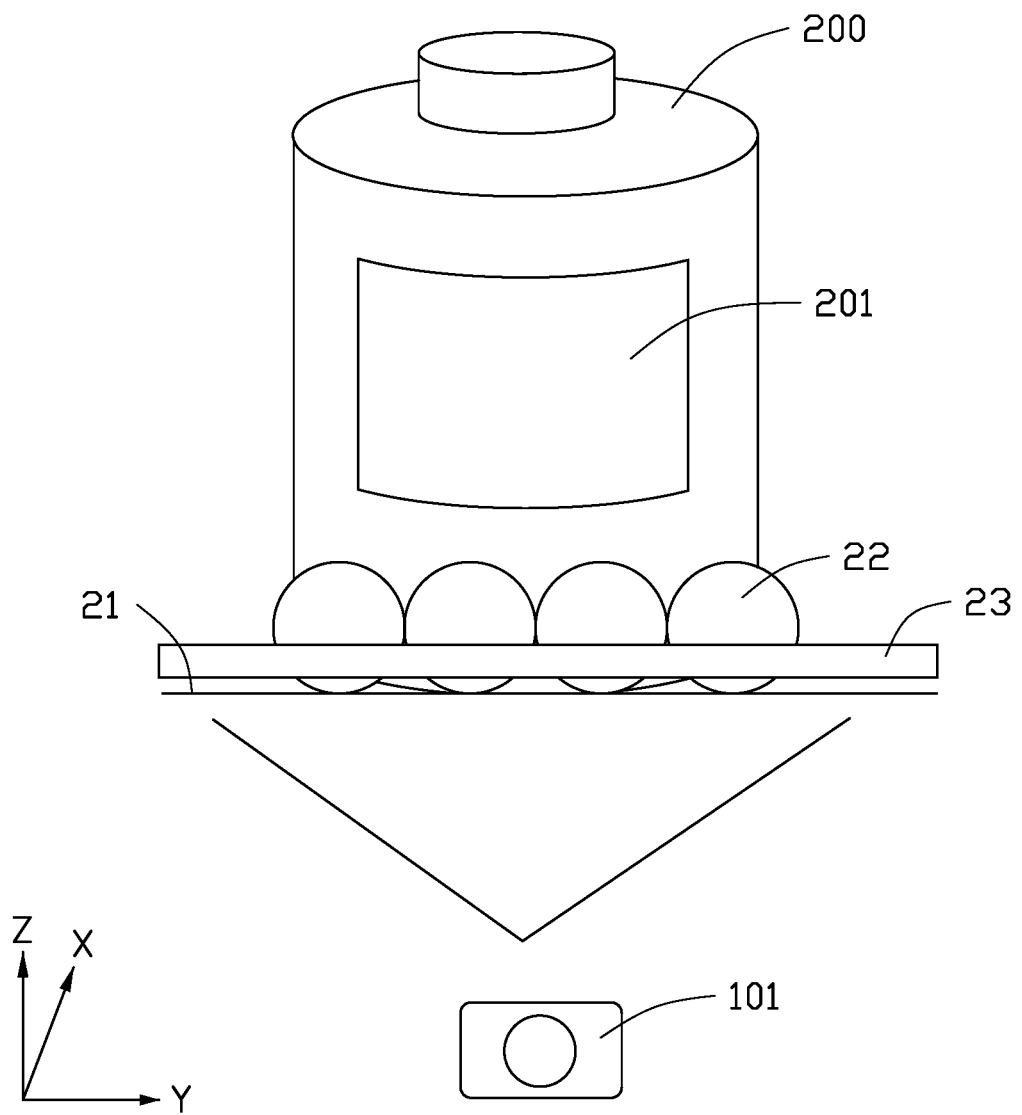
FIG. 1 illustrates a schematic diagram of at least one embodiment of a scene for detecting label on curved container according to the present disclosure.
Figure 2:
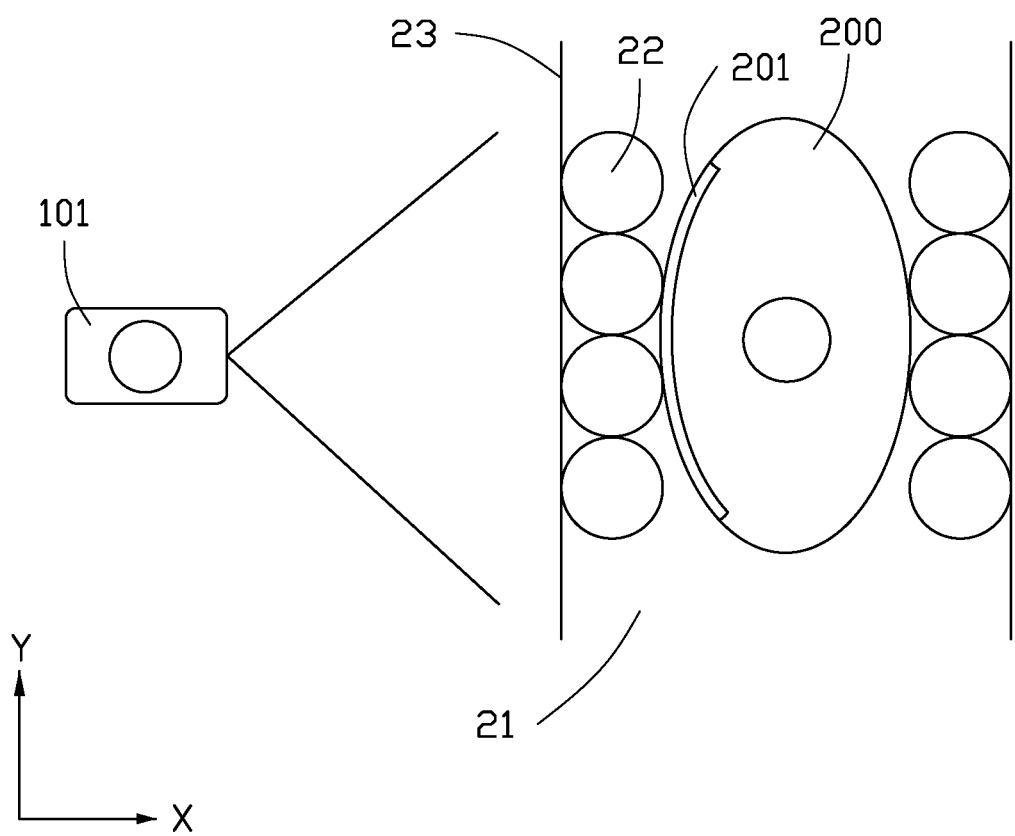
FIG. 2 illustrates a top view of the scene of FIG. 1.

FIG. 1 illustrates a schematic diagram of at least one embodiment of a scene for detecting label on curved container on a manufacturing line. FIG. 2 illustrates a top view of the scene of FIG. 1.

Referring to FIG. 1, the manufacturing line includes a conveyor belt 21, a guide rail 22, and a guard bar 23. A curved container 200 is placed on the conveyor belt 21, a control machine of the manufacturing line can control the conveyor belt 21 to move and drive the curved container 200. The guide rail 22 and a guard bar 23 are arranged above the conveyor belt 21, the guard bar 23 is for preventing the curved container 200 from moving out of the conveyor belt 21. The guide rail 22 is arranged in a fixed area, the guide rail 22 is secured to the guard bar 23 and without contact with the conveyor belt 21. That is, the guide rail 22 is fixed, the movement of the conveyor belt 21 cannot drive the guide rail 22. The curved container 200 is arranged with a label 201 thereon. A camera device 101 is configured to capture images of the curved container 200 to obtain an image of the label 201.

Referring to FIG. 2, two guard bars 23 are arranged on two sides of the conveyor belt 21 along a width direction (that is an x-axis direction). A distance between the two guide rails 22 is at least greater than a maximum thickness of the curved container 200, so the curved container 200 can pass through the two guide rails 22. When the curved container 200 moves to the area of the guide rails 22, the guide rails 22 can adjust a rotation angle of the curved container 200 related to the conveyor belt 21 in a length direction (that is a y-axis direction), to recover the rotation angle to a normal angle range. The normal angle range indicates an angle range of the camera device 101 that being capable of capturing images of the label 201, such as the rotation angle θ meets $-15° \leq \theta \leq 15°$. A plus and a minus direction of the rotation angle can be set according to actual demands.

In at least one embodiment, the guide rails 22 may be ball guide rails, which may decrease a force of friction between the curved container 200 and the guide rails 22 when adjusting the rotation angle of the curved container 200.

A capturing direction of the camera device 101 may be corresponding to a side of the curved container 200 having the label 201. A capturing range of the camera device 101 may cover the maximum width of the curved container 200.

In at least one embodiment, the camera device 101 may transmit the image of the curved container 200 including the label 201 to a device for detecting label. The device for detecting label may detect the image of the curved container 200 having the label 201 using a method for detecting label of at least one embodiment, to determine whether the label 201 is offset.

The method for detecting label of at least one embodiment is described hereinafter.

Figure 3:
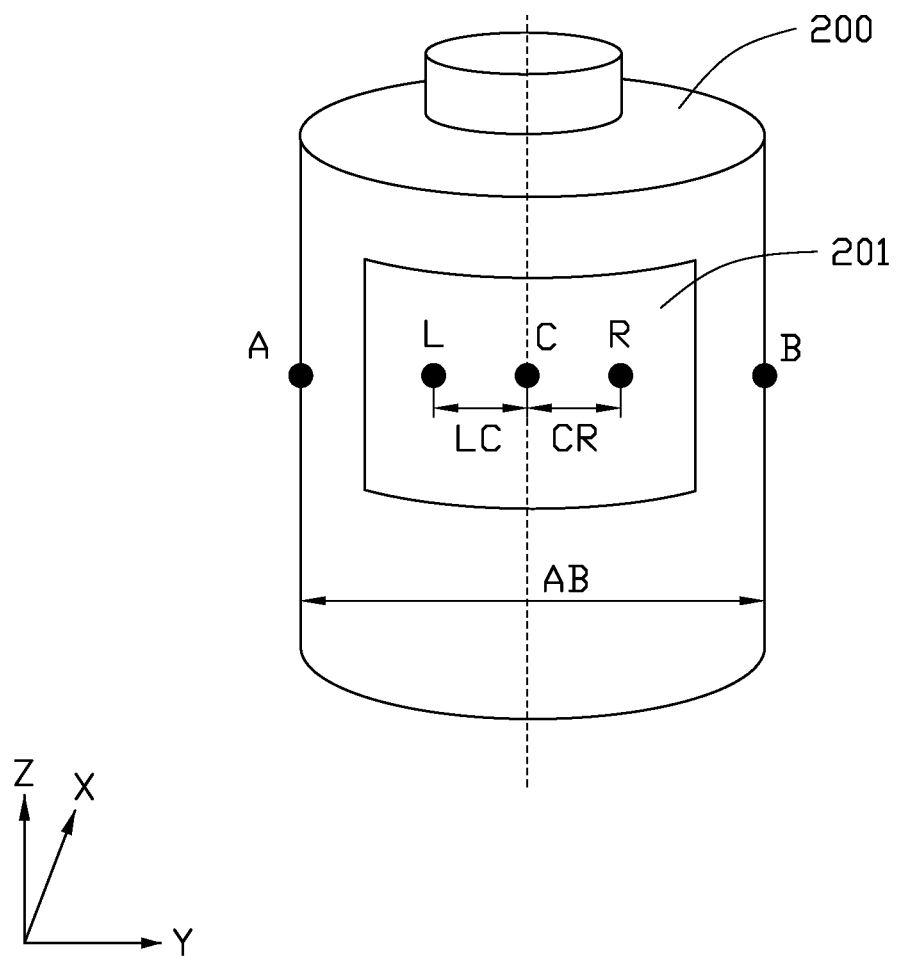
FIG. 3 illustrates a schematic diagram of at least one embodiment of marking reference points on the curved container.
Figure 4:
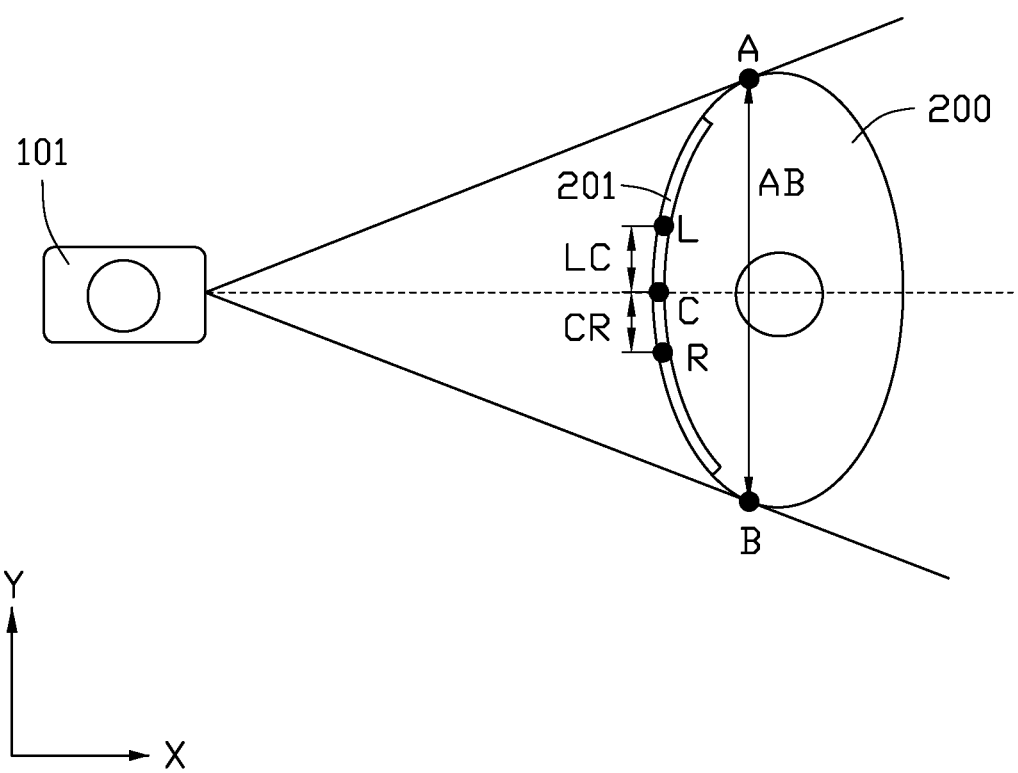
FIG. 4 illustrates a top view of the scene of FIG. 3.

Referring to FIGS. 3 and 4, FIG. 3 illustrates a schematic diagram of at least one embodiment of marking reference points on the curved container 200, FIG. 4 illustrates a top view of FIG. 3.

Referring to FIG. 3, five reference points C, L, R, A, B are marked on the curved container 200. Wherein, the reference point C may be a point on a main axis (that is a z-axis) of the label 201. The reference points L and R are two points on two sides of the reference point C in the width direction of the curved container 200. The reference points C, L, R are all on the label 201. The reference point A may be a point on an edge of the curved container 200 in a $\overrightarrow{CL}$ direction extending from the reference point L. The reference point B may be a point on an edge of the curved container 200 in a $\overrightarrow{CR}$ direction extending from the reference point R.

Referring to FIG. 4, in the capturing angle of the camera device 101, the reference points A and B may be points on two opposite edges of the curved container 200 in the width direction that can be captured by the camera device 101. In the image of the curved container 200 captured by the camera device 101, a distance between the reference points A and B in the length direction of the conveyor belt 21 (that is a y-axis direction) is smaller than the maximum width of the curved container 200.

Since the position of the label 201 on the curved container 200 is fixed, no matter whether the label 201 is offset, the distances between any two of the reference points C, L, and R, are changeless. When the label 201 is offset, relative positions between any one of the reference points C, L, and R and any one of the reference points A and B are changed accordingly. If determining whether the label 201 is offset by whether the relative positions changed, when the curved container 200 rotates, errors may be occurred. The errors indicate that mis-determining normal data as abnormal data.

Figure 5:
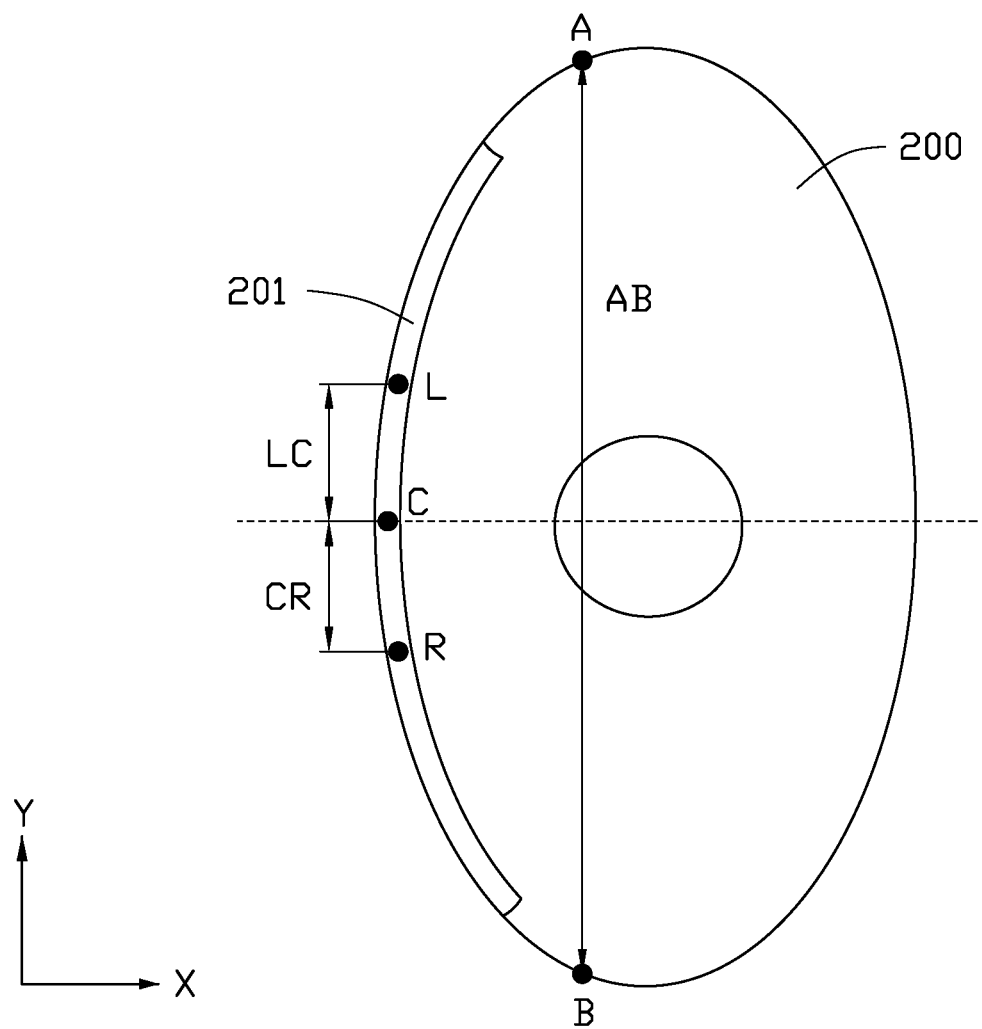
FIG. 5 illustrates a schematic diagram of at least one embodiment of the curved container before being rotated.
Figure 6:
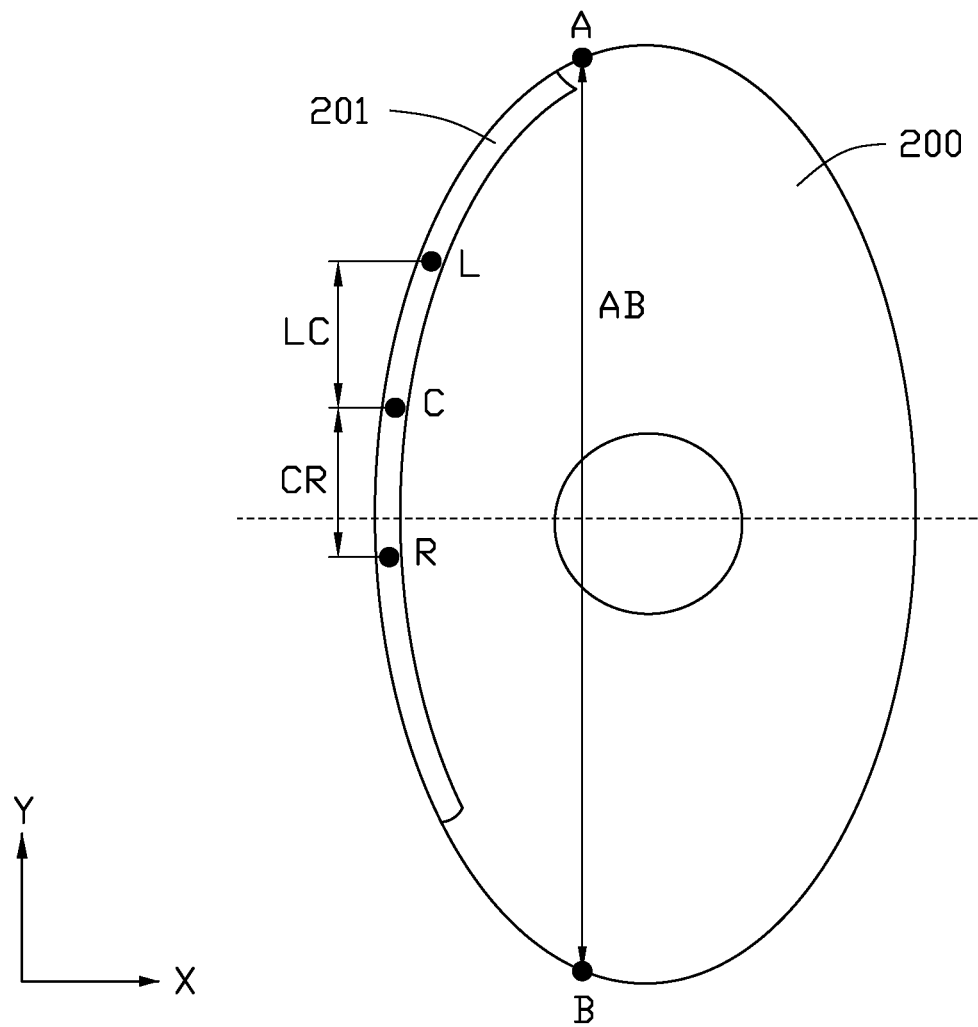
FIG. 6 illustrates another schematic diagram of at least one embodiment of the curved container before being rotated.
Figure 7:
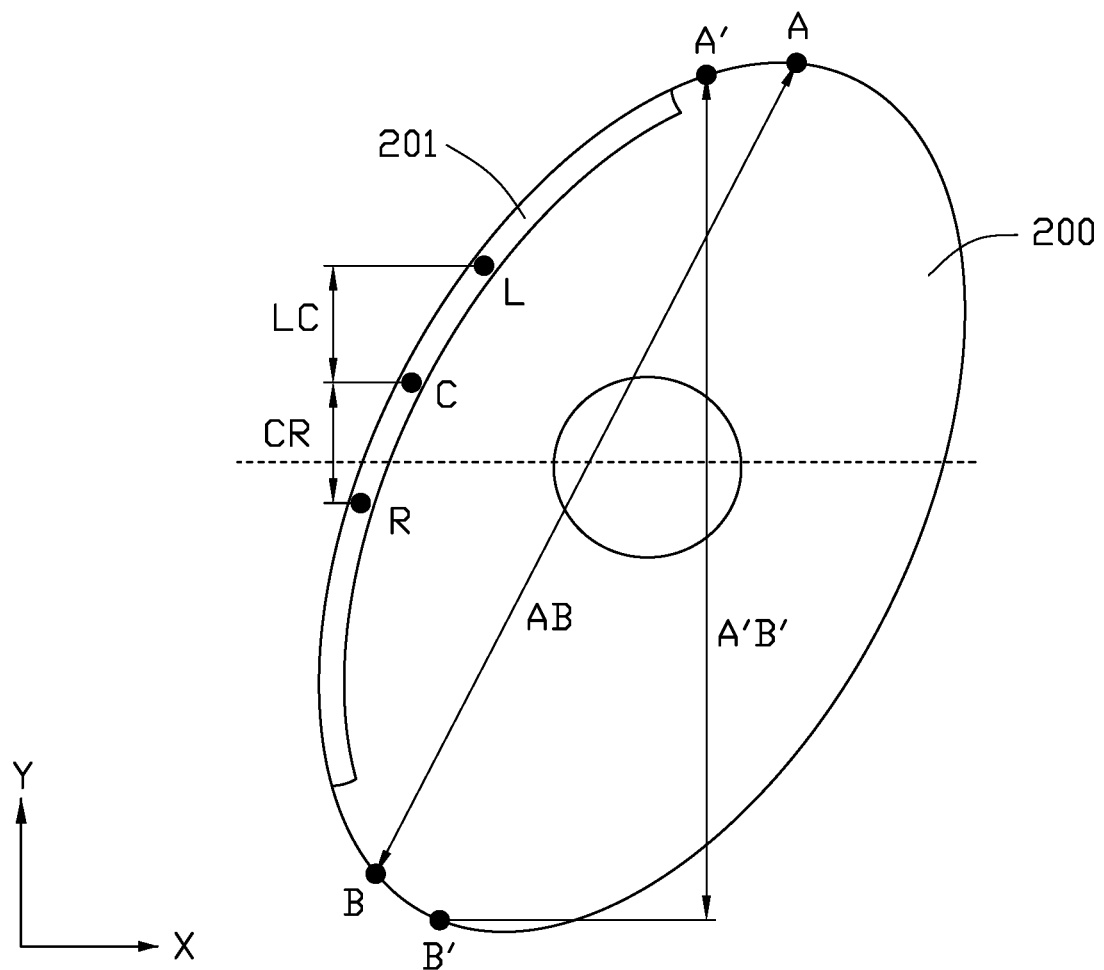
FIG. 7 illustrates a schematic diagram of at least one embodiment of the curved container being rotated.

For instance, referring to FIGS. 5, 6, and 7, FIGS. 5 and 6 illustrate top views of the curved container 200 before rotation, FIG. 7 illustrates a top view of the curved container 200 being rotated.

Referring to FIG. 5, before the curved container 200 rotated, relative positions between any one of the reference points C, L, and R and any one of the reference points A and B are unchanged, the label 201 is not offset can be determined.

Referring to FIG. 6, before the curved container 200 rotated, relative positions between any one of the reference points C, L, and R and any one of the reference points A and B are changed, the label 201 is offset can be determined.

Referring to FIG. 7, the curved container 200 is rotated, in the capturing angle of the camera device 101, the points on two opposite edges of the curved container 200 in the width direction that can be captured by the camera device 101 are changed to reference points A' and B'. At this moment, relative positions between any one of the reference points C, L, and R and any one of the reference points A' and B' changed, the label 201 being offset is determined. However, the label 201 is actually not offset, the determining result may be error.

For solving the abovementioned problem, the method for detecting label of the present disclosure may predict the distance between the reference points A' and B' when the curved container 200 rotated using regression analysis method, compare a predicted value and an actual value of the distance between the reference points A' and B', and determine whether the label 201 is offset according to the compared result.

Figure 8:
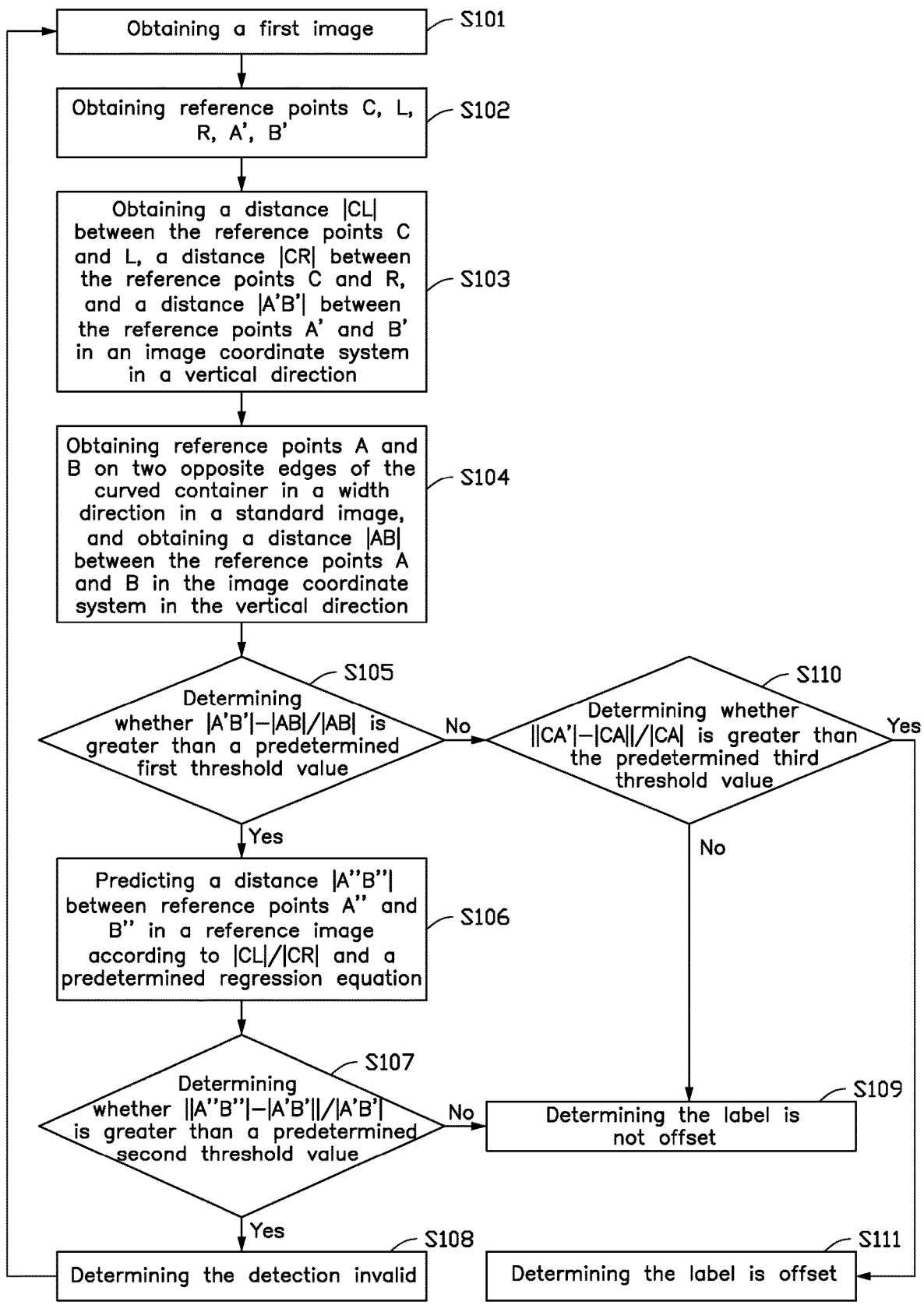
FIG. 8 illustrates a flowchart of at least one embodiment of a method for detecting label on curved container according to the present disclosure.

In detail, FIG. 8 illustrates a flowchart of at least one embodiment of the method for detecting label on curved container according to the present disclosure.

The method for detecting label may be applied in the device for detecting label. As shown in FIG. 8, the method for detecting label may include the followings.

At block S101, obtaining a first image.

The first image indicates an image of the curved container including the label.

In at least one embodiment, the camera device captures the first image. The device for detecting label may obtain the first image from the camera device.

At block S102, obtaining reference points C, L, R, A', B'.

In at least one embodiment, the device for detecting label may perform template matching to the first image and template images with marked reference points, to obtain a template image corresponding to the first image, and mark reference points in the first image according to relative positions of the marked reference points in the obtained template image.

The template images may come from test samples.

At block S103, obtaining a distance |CL| between the reference points C and L, a distance |CR| between the reference points C and R, and a distance |A'B'| between the reference points A' and B' in an image coordinate system in a vertical direction.

As shown in FIG. 7, each of |CL|, |CR|, and |A'B'| indicates a distance between two points in the image coordinate system in the vertical direction (that is a y-axis direction).

At block S104, obtaining reference points A and B on two opposite edges of the curved container in a width direction in a standard image, and obtaining a distance |AB| between the reference points A and B in the image coordinate system in the vertical direction.

The standard image is an image of the curved container without rotation and the label without offset.

In at least one embodiment, the device for detecting label may invoke the standard image from the test samples, calculate the distance |AB| between the reference points A and B in the image coordinate system in the vertical direction (that is the y-axis direction) according to the positions of the reference points A and B in the standard image.

At block S105, determining whether ||A'B'|−|AB||/|AB| is greater than a predetermined first threshold value.

If ||A'B'|−|AB||/|AB| is greater than the first threshold value, the procedure goes to block S106. Otherwise, the procedure goes to block S110.

In at least one embodiment, ||A'B'|−|AB||/|AB| indicates a difference after normalization of a first width and a predetermined standard width. The first width indicates the distance |A'B'| between the reference points A' and B' in the image coordinate system in the vertical direction of the first image. The standard width indicates the distance |AB| between the reference points A and B in the image coordinate system in the vertical direction of the standard image.

When ||A'B'|−|AB||/|AB| is smaller than or equal to the first threshold value, the distances of the reference points on two opposite edges of the curved container in the width direction of the first image and the standard image are close, the curved container is not rotated can be determined.

When ||A'B'|−|AB||/|AB| is greater than the first threshold value, the distances of the reference points on two opposite edges of the curved container in the width direction of the first image and the standard image are different, the curved container is rotated can be determined.

In at least one embodiment, the first threshold value $\mu$ meets: $0<\mu\leq0.01$. However, the first threshold value can be set according to actual demands. Value ranges of a second threshold value and a third threshold value hereinafter may be the same with the first threshold value.

At block S106, predicting a distance |A"B"| between reference points A" and B" in a reference image according to |CL|/|CR| and a predetermined regression equation.

The reference image indicates an image of a rotation angle of the curved container is same with the first image and the label is not offset. The reference points A" and B" are reference points on two opposite edges of the curved container in the image coordinate system in the width direction of the reference image.

|CL|/|CR| indicates first position data of the label. That is, the first position data indicates a ratio of the distance |CL| between the reference points C and L and the distance |CR| between the reference points C and R in the image coordinate system in the vertical direction of the first image.

In at least one embodiment, the regression equation is configured to describe a corresponding relationship of |CL|/|CR| and |A"B"| when the label is not offset. A method for obtaining the regression equation may be referred to FIG. 9.

No matter whether the label is offset, relative positions of any two of the reference points C, L, R are not changed. Thus, obtaining the distance |CL| between the reference points C and L and the distance |CR| between the reference points C and R in the image coordinate system in the vertical direction according to the positions of the reference points C, L, R in the first image, substituting |CL|/|CR| into the regression equation, to obtain the distance |A"B"| between reference points A" and B" in the image coordinate system in the vertical direction in the reference image.

At block S107, determining whether ||A"B"|−|A'B'||/|A'B'| is greater than the predetermined second threshold value.

If ||A"B"|−|A'B'||/|A'B'| is greater than the predetermined second threshold value, the procedure goes to block S108. Otherwise, the procedure goes to block S109.

In at least one embodiment, ||A"B"|−|A'B'||/|A'B'| indicates a difference after normalization of the first width and a second width. The second width indicates the distance |A"B"| between the reference points A" and B" in the image coordinate system in the vertical direction of the reference image.

At block S108, determining the detection invalid.

In at least one embodiment, since ||A'B'|−|AB||/|AB| is greater than the first threshold value, determining the curved container is rotated. Since ||A"B"|−|A'B'||/|A'B'| is greater than the second threshold value, the distances of the reference points on two opposite edges of the curved container in the width direction of the first image and the standard image are different, at this time it's not sure that whether the difference (that is ||A"B"|−|A'B'||) of the two distances is caused by the rotation of the curved container or caused by label offset, so the detection invalid is determined.

In block S108, when the detection invalid is determined, the procedure goes back to block S101, that is reobtaining the first image and processing the detection.

At block S109, determining the label is not offset.

In at least one embodiment, when ||A"B"|−|A'B'||/|A'B'| is smaller than and equal to the second threshold value, the distances of the reference points on two opposite edges of the curved container in the width direction of the first image and the standard image are close, so the label is not offset can be determined.

At block S110, determining whether ||CA'|−|CA||/|CA| is greater than the predetermined third threshold value.

If ||CA'|−|CA||/|CA| is greater than the predetermined third threshold value, the procedure goes to block S111. Otherwise, the procedure goes to block S109.

In at least one embodiment, when the curved container is not rotated is determined, determining whether the label is offset.

||CA'|−|CA||/|CA| indicates a difference after normalization of a second position data and the predetermined standard position data. The second position data indicates a distance |CA'| between the reference points C and A' in the image coordinate system in the width direction of the first image. The standard position data indicates the distance |CA| between the reference points C and A in the image coordinate system in the width direction of the standard image.

When ||CA'|−|CA||/|CA| is greater than the third threshold value, the distances of the reference points on an edge of the curved container in the width direction of the first image and the standard image are different, the label is offset can be determined.

When $\||CA'|-|CA|\|/|CA|$ is smaller than or equal to the third threshold value, the distances of the reference points on an edge of the curved container in the width direction of the first image and the standard image are close, the label is not offset can be determined.

In block S111, determining the label is offset.

In at least one embodiment, since $\||A'B'|-|AB|\|/|AB|$ is smaller than or equal to the first threshold value, the curved container is not rotated can be determined. Since $\||CA'|-|CA|\|/|CA|$ is greater than the third threshold value, the distances of the reference points on a central axis of the label and the reference points on an edge of the curved container in the width direction are different, at this time the difference (that is $\||CA'|-|CA|\|$) of the two distances is caused by the label offset, so the label is offset can be determined, and an offset value of the label may be $\||CA'|-|CA|\|$.

A method for obtaining the regression equation is described hereinafter.

Figure 9:
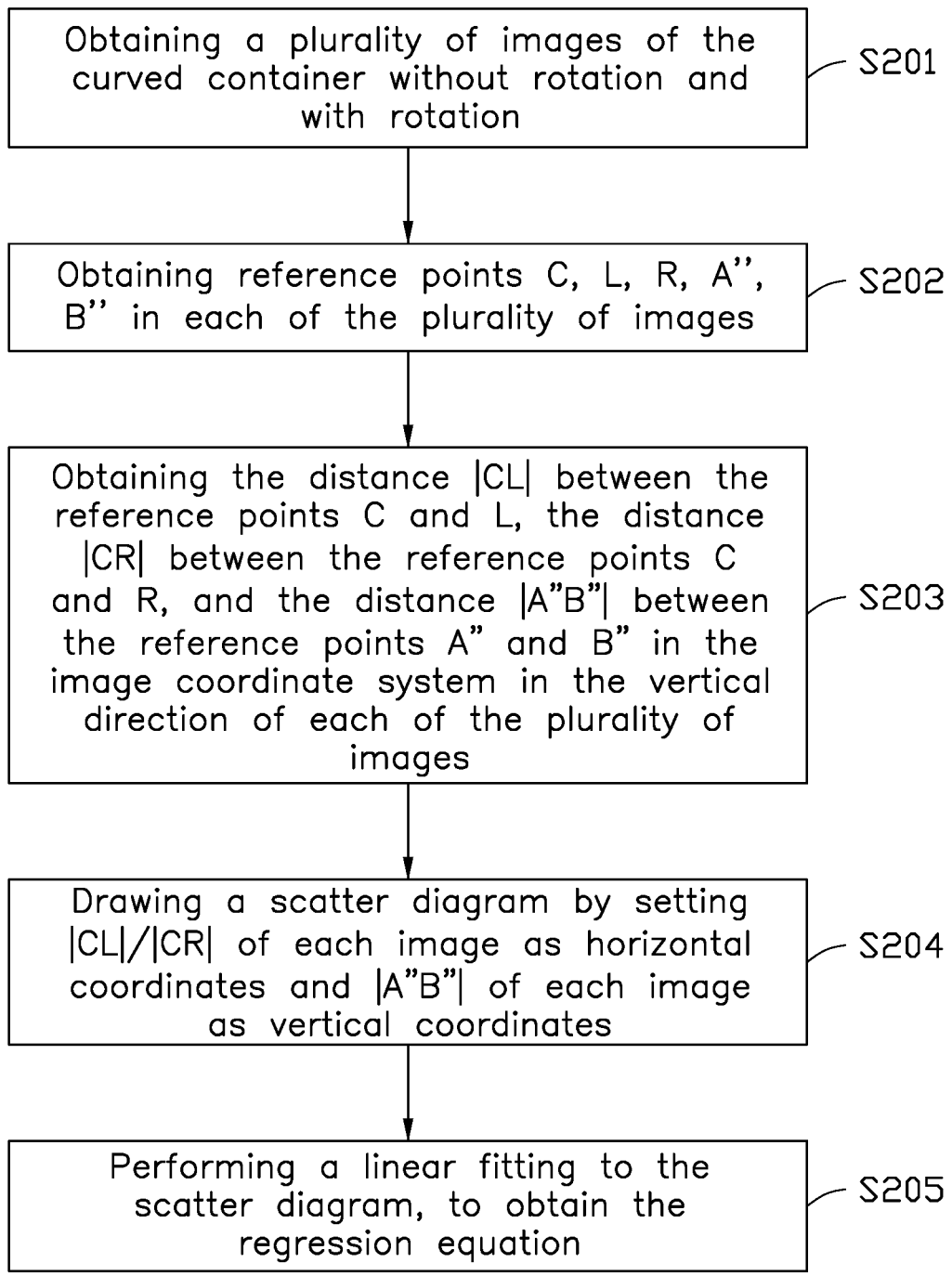
FIG. 9 illustrates a flowchart of at least one embodiment of a method for obtaining a regression equation before block S106 of the method of FIG. 8.

FIG. 9 illustrates a flowchart of at least one embodiment of a method for obtaining the regression equation before block S106 of the method of FIG. 8.

Referring to FIG. 9, the method for obtaining the regression equation may include:

At block S201, obtaining a plurality of images of the curved container without rotation and with rotation.

In at least one embodiment, arranging the camera device to be aligned to the central axis of the curved container without rotation, the camera device captures an image of the curved container without rotation. After rotating the curved container for server times, the camera device captures an image of the curved container each time the curved container is rotated, so as to simulate images may be captured during the curved container is rotating in the actual detecting environment.

At block S202, obtaining reference points C, L, R, A", B" in each of the plurality of images.

At block S203, obtaining the distance |CL| between the reference points C and L, the distance |CR| between the reference points C and R, and the distance |A"B"| between the reference points A" and B" in the image coordinate system in the vertical direction of each of the plurality of images.

Detail description of blocks S202 and S203 may be referred to that of blocks S102 and S103 of FIG. 8, which is no more repeated here.

At block S204, drawing a scatter diagram by setting |CL|/|CR| of each image as horizontal coordinates and |A"B"| of each image as vertical coordinates.

In at least one embodiment, each of the plurality of images has corresponding |CL|/|CR| and |A"B"|, setting |CL|/|CR| of each image as horizontal coordinates and |A"B"| of each image as vertical coordinates, so as to obtain the scatter diagram.

When the curved container is rotated, the value of |CL|/|CR| changes accordingly, |CL|/|CR| indicates a degree of the rotation of the curved container. In at least one embodiment, when the value of |CL|/|CR| closes to 1, the degree of the rotation of the curved container is small.

At block S205, performing a linear fitting to the scatter diagram, to obtain the regression equation.

Figure 10:
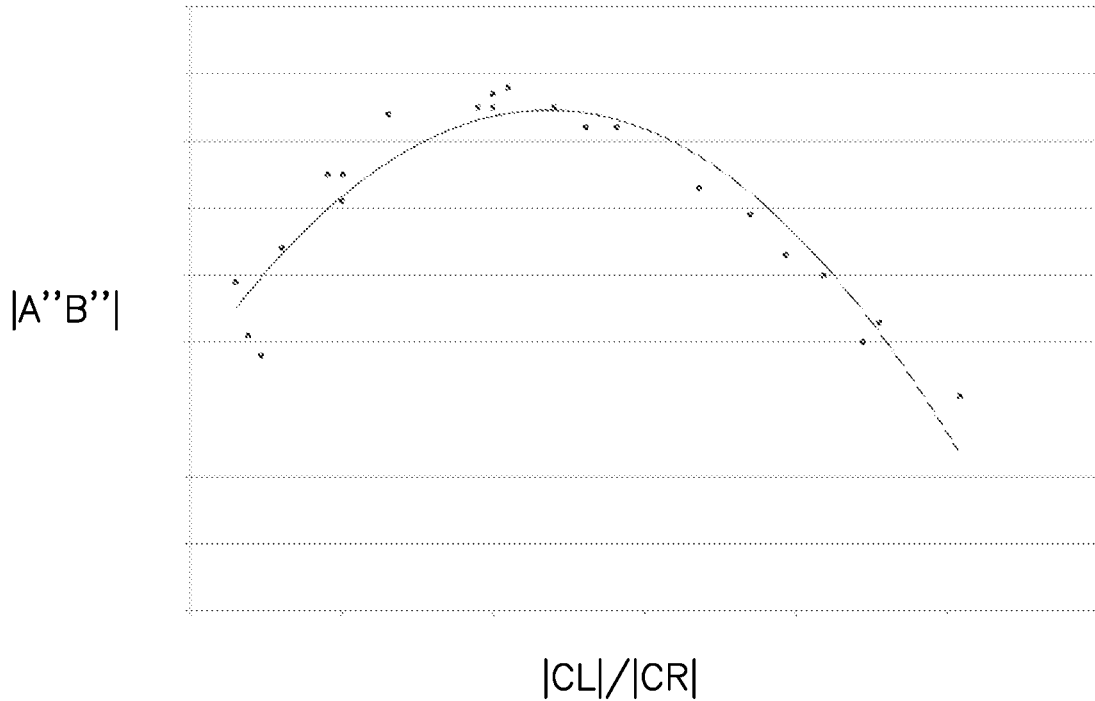
FIG. 10 illustrates a schematic diagram of at least one embodiment of linear fitting according to the present disclosure.

For instance, FIG. 10 illustrates a schematic diagram of at least one embodiment of the linear fitting. Referring to FIG. 10, a unit of the vertical coordinate is a quantity of pixel, a fitting curve is a polynomial equation, the polynomial equation is the regression equation of the fitting curve. When the more the value of |CL|/|CR| closes to 1, the corresponding |A"B"| is greater. Wherein, the quantity of pixel can be converted into length unit.

Figure 11:
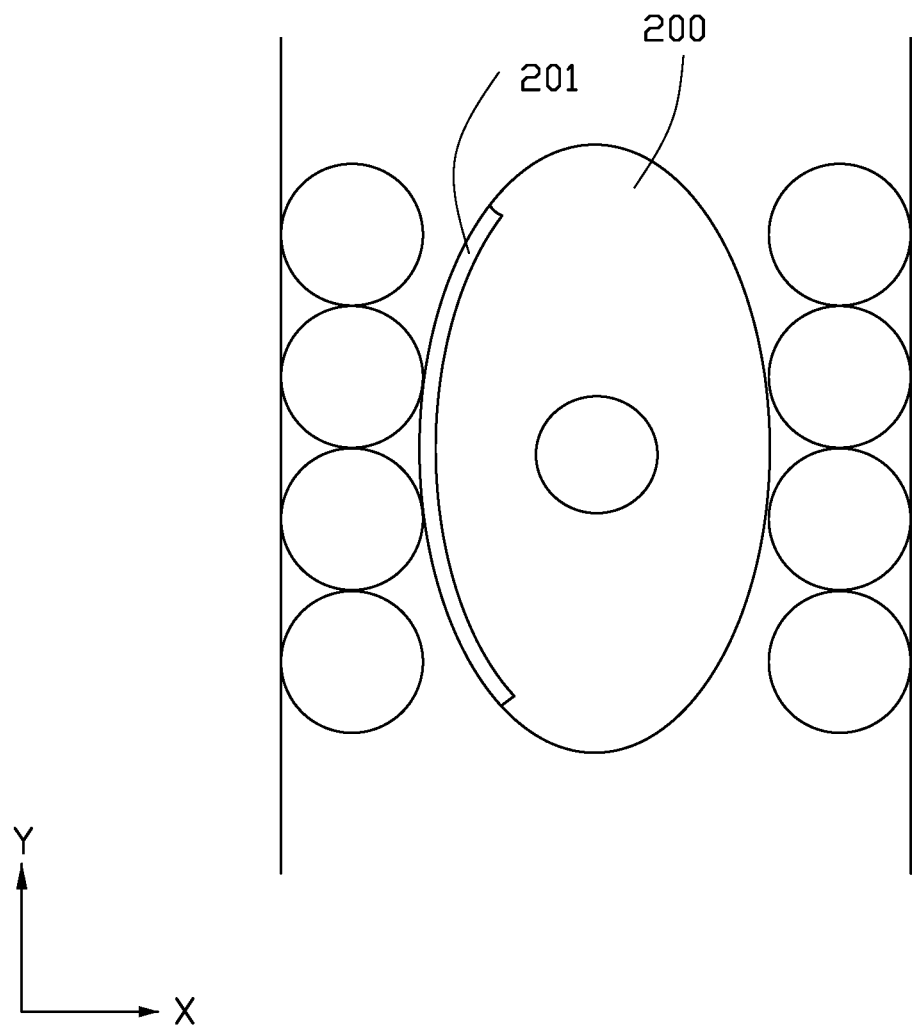
FIG. 11 illustrates a schematic diagram of another embodiment of the curved container before being rotated.
Figure 12:
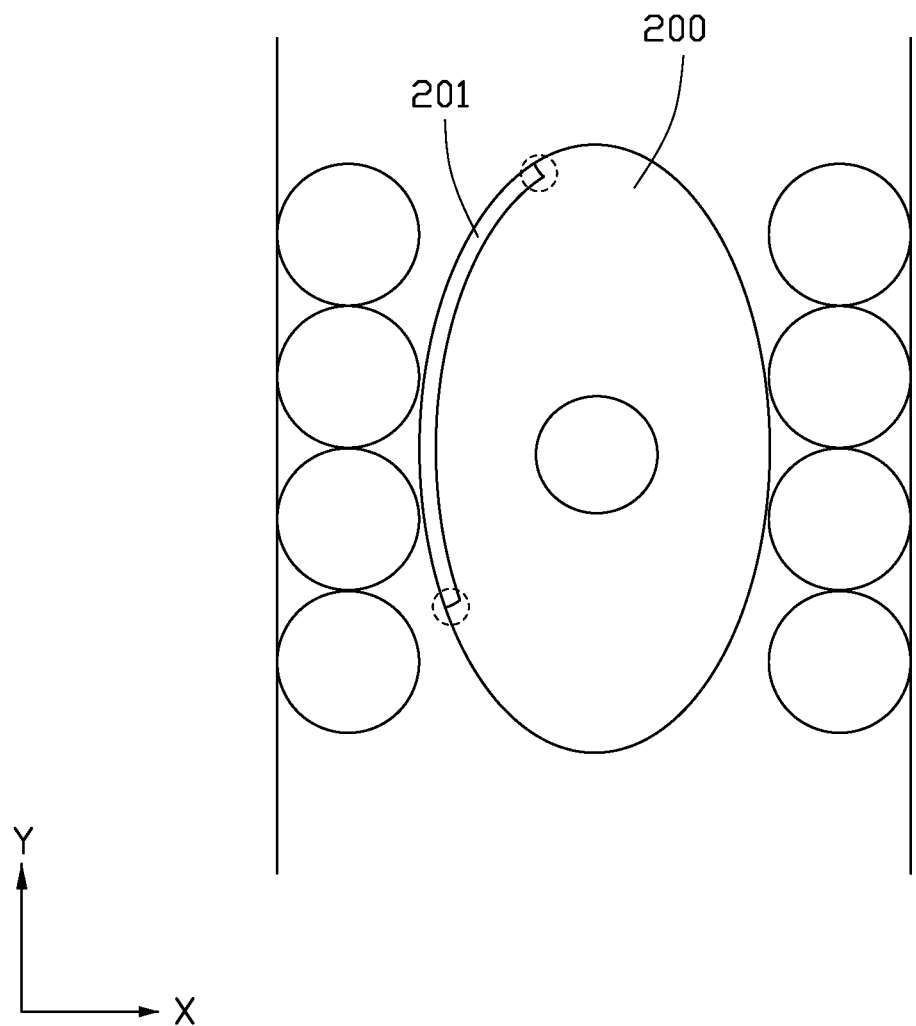
FIG. 12 illustrates another schematic diagram of another embodiment of the curved container before being rotated.
Figure 13:
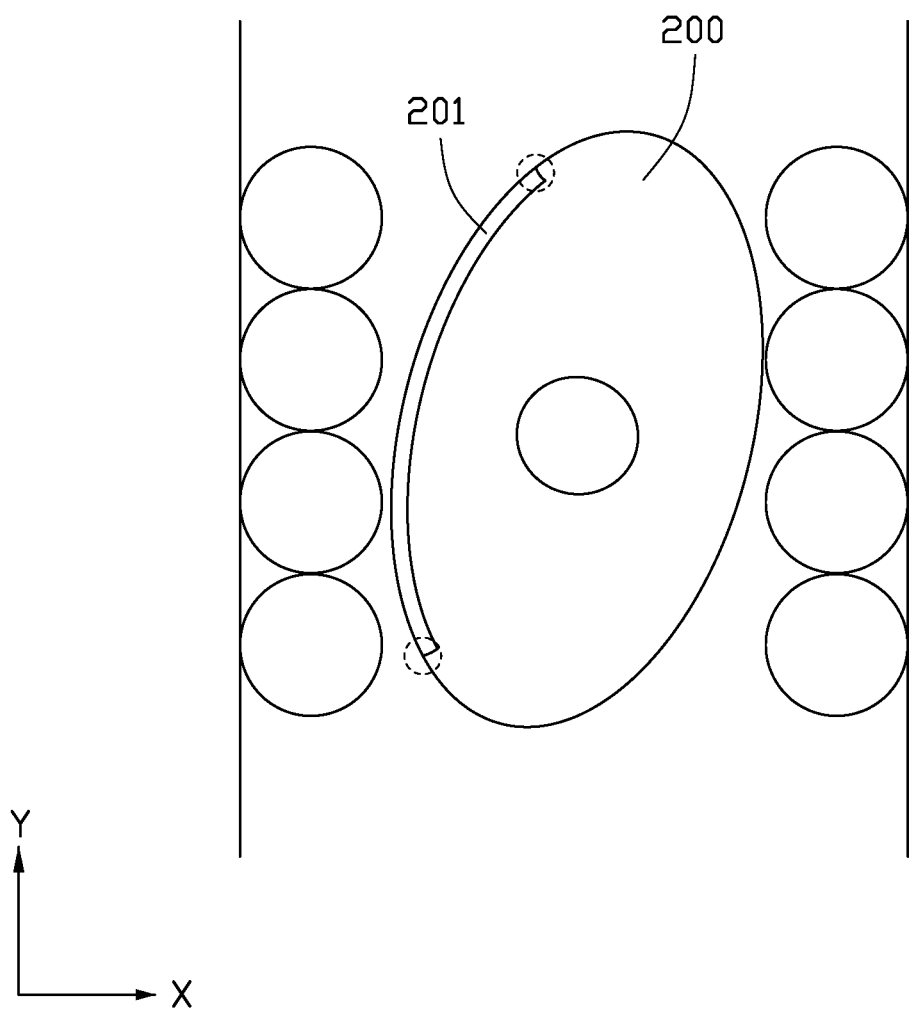
FIG. 13 illustrates a schematic diagram of another embodiment of the curved container being rotated.

Referring to FIGS. 11, 12, and 13, FIGS. 11 and 12 illustrates schematic diagrams of the curved container without rotation, FIG. 13 illustrates a schematic diagram of the curved container with rotation. FIGS. 11, 12, and 13 do not show the reference points. The method for detecting label of at least one embodiment may detect the label on the curved container in three scenes of FIGS. 11, 12, and 13.

As shown in FIG. 11, since $\||A'B'|-|AB|\|/|AB|$ is smaller than or equal to the first threshold value, determining the curved container is not rotated. Since $\||CA'|-|CA|\|/|CA|$ is smaller than or equal to the third threshold value, determining the label is not offset.

As shown in FIG. 12, since $\||A'B'|-|AB|\|/|AB|$ is smaller than or equal to the first threshold value, determining the curved container is not rotated. Since $\||CA'|-|CA|\|/|CA|$ is greater than the third threshold value, determining the label is offset.

As shown in FIG. 13, since $\||A'B'|-|AB|\|/|AB|$ is greater than the first threshold value, determining the curved container is rotated. Since $\||CA'|-|CA|\|/|CA|$ is smaller than or equal to the third threshold value, determining the label is not offset.

The method for detecting label of at least one embodiment may detect whether the curved container is rotated, as well as detect whether the label on the curved container is offset. Additionally, the method can prevent affection to the detection result of the label when the curved container is rotated, so as to improve a precision of the detection result of the label.

A device for detecting label of at least one embodiment is described hereinafter.

Figure 14:
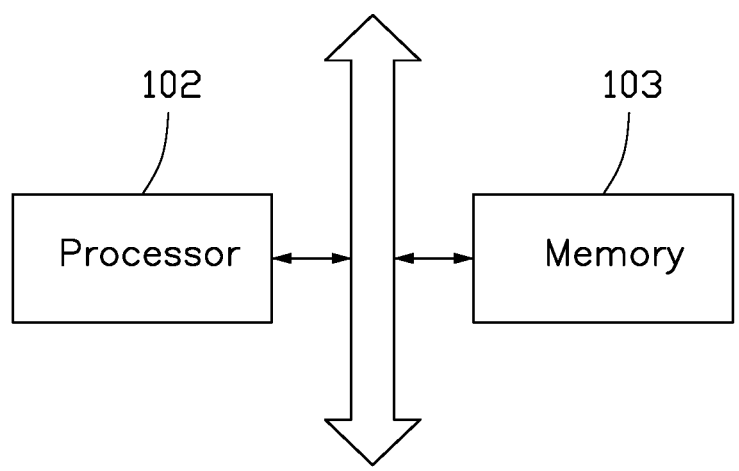
FIG. 14 illustrates a schematic diagram of at least one embodiment of a device for detecting label on curved container according to the present disclosure.

FIG. 14 illustrates a schematic diagram of at least one embodiment of a device for detecting label on curved container.

The device 100 for detecting label includes a processor 102 and a memory 103. Various types of non-transitory computer-readable storage mediums stored in the memory 103 can be processed by the at least one processor 102 to perform various functions, such as the method for detecting label.

In at least one embodiment, the processor 102 can be formed by integrated circuits, such as an individual integrated circuit or multiple integrated circuits with a same function or different functions. The processor 102 may include one or more processing units. The processor 102 includes, but is not limited to, a central processing unit (CPU), a microprocessor, a digital signal processor (DSP), a graphics processor, an application specific integrated circuit (ASIC), a field-programmable gate array (FPGA), a data processor chip, a programable logic device (PLD), a discrete gate/transistor logic device, or a discrete hardware component. The processor 102 may be a control unit and electrically connected to other elements of the device 100 through interfaces or a bus.

In at least one embodiment, the memory 103 can include various types of non-transitory computer-readable storage mediums. The memory 103 can rapidly and automatically access instructions and data when the system 1 is running. The memory 103 can be an internal storage system, such as a flash memory, a Random Access Memory (RAM) for the temporary storage of information, and/or a Read-Only Memory (ROM), a Programmable Read-Only Memory (PROM), Erasable Programmable Read-Only Memory (EPROM), a One-time Programmable Read-Only Memory (OTPROM), Electrically-Erasable Programmable Read-Only Memory (EEPROM), and a Compact Disc Read-Only Memory (CD-ROM) for the permanent storage of information. The memory 103 can also be an external storage system, such as a hard disk, a storage card, or a data storage medium.

In at least one embodiment, the device 100 for detecting label may further include a camera device.

The structure of the device 100 detecting label shown in at least one embodiment does not constitute a specific limitation. In other embodiments of the present disclosure, the device 100 for detecting label may include more or fewer components than shown in the figures, combine certain components, separate certain components, or arrange different components.

A non-transitory computer-readable storage medium including program instructions for causing the computer apparatus (such as personal computer, device, or network device, etc.) or the processor to perform the method for detecting label is also disclosed.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A method for detecting label on curved container, the method comprising:
   obtaining a first image by a camera device, the first image comprising a label on the curved container;
   obtaining a first image by a camera device a plurality of reference points in the first image through template matching performed by a device for detecting label;
   obtaining a first width of the curved container and first position data of the label according to the plurality of reference points;
   determining whether the curved container is rotated according to the first width and a predetermined standard width;
   in response that the curved container rotation is determined, predicting a second width of the curved container according to the first position data and a predetermined regression equation; and
   determining whether the label is offset according to the first width and the second width.

2. The method according to claim 1, wherein the determining whether the curved container is rotated according to the first width and the predetermined standard width, comprises:
   in case that a difference after normalization of the first width and the predetermined standard width is greater than a predetermined first threshold value, determining the curved container is rotated; and
   in case that the difference after normalization of the first width and the predetermined standard width is smaller than or equal to the predetermined first threshold value, determining the curved container is not rotated.

3. The method according to claim 1, wherein the determining whether the label is offset according to the first width and the second width, comprises:
   in case that a difference after normalization of the first width and the second width is greater than a predetermined second threshold value, determining the detection invalid; and
   in case that a difference after normalization of the first width and the second width is smaller than or equal to the predetermined second threshold value, determining the label is not offset.

4. The method according to claim 1, further comprising:
   in response that the curved container rotated is not determined, obtaining second position data of the label according to the plurality of reference points; and
   determining whether the label is offset according to the second position data and a predetermined standard position data.

5. The method according to claim 4, wherein the determining whether the label is offset according to the second position data and the predetermined standard position data, comprises:
   in case that a difference after normalization of the second position data and the predetermined standard position data is greater than a predetermined third threshold value, determining the label is offset; and
   in case that the difference after normalization of the second position data and the predetermined standard position data is smaller than or equal to the predetermined third threshold value, determining the label is not offset.

6. The method according to claim 1, wherein the plurality of reference points comprises reference points C, L, R, A', B', the reference point C is positioned in a central axis of the label, the reference points L and R are positioned on two opposite sides of the reference point C of the label, the reference points A' and B' are positioned on two opposite edges of the curved container in a width direction.

7. The method according to claim 6, wherein the first width is a distance |A'B'| between the reference points A' and B' in the image coordinate system in the vertical direction of the first image;
   the standard width is a distance |AB| between the reference points A and B in the image coordinate system in the vertical direction of the standard image;
   the first position data is a ratio |CL|/|CR| of the distance |CL| between the reference points C and L and the distance |CR| between the reference points C and R in the image coordinate system in the vertical direction of the first image;
   the second width is the distance |A"B"| between the reference points A" and B" in the image coordinate system in the vertical direction of the reference image, the reference points A" and B" are positioned on two opposite edges of the curved container in the width direction of the reference image;
   the standard image is an image in which the curved container is not rotated and the label is not offset, the reference image is an image in which the curved container is rotated at a same angle as the first image and the label is not offset.

8. The method according to claim 7, wherein the determining whether the curved container is rotated according to the first width and the predetermined standard width, comprises:
   in case that $||A'B'|-|AB||/|AB|$ is greater than the predetermined first threshold value, determining the curved container is rotated; and
   in case that $||A'B'|-|AB||/|AB|$ is smaller than and equal to the predetermined first threshold value, determining the curved container is not rotated.

9. The method according to claim 7, wherein the determining whether the label is offset according to the first width and the second width, comprises:

in case that $||A"B"|-|A'B'||/|A'B'|$ is greater than the predetermined second threshold value, determining the detection invalid; and in case that $||A"B"|-|A'B'||/|A'B'|$ is smaller than and equal to the predetermined second threshold value, determining the label is not offset.

10. A device for detecting label on curved container, the device comprising:

at least one processor; and at least one memory coupled to the at least one processor and storing program instructions;

the at least one memory and the program instructions configured to, with the at least one processor, cause the device to perform:

obtaining a first image by a camera device, the first image comprising a label on the curved container;

obtaining a plurality of reference points in the first image;

obtaining a first width of the curved container and first position data of the label according to the plurality of reference points;

determining whether the curved container is rotated according to the first width and a predetermined standard width;

in response that the curved container rotation is determined, predicting a second width of the curved container according to the first position data and a predetermined regression equation; and determining whether the label is offset according to the first width and the second width.

11. The device according to claim 10, wherein the determining whether the curved container is rotated according to the first width and the predetermined standard width, comprises:

in case that a difference after normalization of the first width and the predetermined standard width is greater than a predetermined first threshold value, determining the curved container is rotated; and in case that the difference after normalization of the first width and the predetermined standard width is smaller than or equal to the predetermined first threshold value, determining the curved container is not rotated.

12. The device according to claim 10, wherein the determining whether the label is offset according to the first width and the second width, comprises:

in case that a difference after normalization of the first width and the second width is greater than a predetermined second threshold value, determining the detection invalid; and in case that a difference after normalization of the first width and the second width is smaller than or equal to the predetermined second threshold value, determining the label is not offset.

13. The device according to claim 10, wherein the at least one memory and the program instructions configured to, with the at least one processor, cause the device further to perform:

in response that the curved container rotated is not determined, obtaining second position data of the label according to the plurality of reference points; and determining whether the label is offset according to the second position data and a predetermined standard position data.

14. The device according to claim 13, wherein the determining whether the label is offset according to the second position data and the predetermined standard position data, comprises:

in case that a difference after normalization of the second position data and the predetermined standard position data is greater than a predetermined third threshold value, determining the label is offset; and in case that the difference after normalization of the second position data and the predetermined standard position data is smaller than or equal to the predetermined third threshold value, determining the label is not offset.

15. The device according to claim 10, wherein the plurality of reference points comprises reference points C, L, R, A', B', the reference point C is positioned in a central axis of the label, the reference points L and R are positioned on two opposite sides of the reference point C of the label, the reference points A' and B' are positioned on two opposite edges of the curved container in a width direction.

16. The device according to claim 15, wherein the first width is a distance $|A'B'|$ between the reference points A' and B' in the image coordinate system in the vertical direction of the first image;

the standard width is a distance $|AB|$ between the reference points A and B in the image coordinate system in the vertical direction of the standard image;

the first position data is a ratio $|CL|/|CR|$ of the distance $|CL|$ between the reference points C and L and the distance $|CR|$ between the reference points C and R in the image coordinate system in the vertical direction of the first image;

the second width is the distance $|A"B"|$ between the reference points A" and B" in the image coordinate system in the vertical direction of the reference image, the reference points A" and B" are positioned on two opposite edges of the curved container in the width direction of the reference image;

the standard image is an image in which the curved container is not rotated and the label is not offset, the reference image is an image in which the curved container is rotated at a same angle as the first image and the label is not offset.

17. The device according to claim 16, wherein the determining whether the curved container is rotated according to the first width and the predetermined standard width, comprises:

in case that $||A'B'|-|AB||/|AB|$ is greater than the predetermined first threshold value, determining the curved container is rotated; and in case that $||A'B'|-|AB||/|AB|$ is smaller than and equal to the predetermined first threshold value, determining the curved container is not rotated.

18. The device according to claim 16, wherein the determining whether the label is offset according to the first width and the second width, comprises:

in case that $||A"B"|-|A'B'||/|A'B'|$ is greater than the predetermined second threshold value, determining the detection invalid; and in case that $||A"B"|-|A'B'||/|A'B'|$ is smaller than and equal to the predetermined second threshold value, determining the label is not offset.

19. A non-transitory computer readable medium comprising program instructions for causing an apparatus to perform at least the follow:

obtaining a first image by a camera device, the first image comprising a label on the curved container;

obtaining a plurality of reference points in the first image through template matching performed by a device for detecting label;

obtaining a first width of the curved container and first position data of the label according to the plurality of reference points;

determining whether the curved container is rotated according to the first width and a predetermined standard width;

in response that the curved container rotation is determined, predicting a second width of the curved container according to the first position data and a predetermined regression equation; and determining whether the label is offset according to the first width and the second width.

20. The non-transitory computer readable medium according to claim 19, further comprising:

in response that the curved container rotated is not determined, obtaining second position data of the label according to the plurality of reference points; and determining whether the label is offset according to the second position data and a predetermined standard position data.

* * * * *